Oct. 4, 1966   H. S. BLANCHARD ET AL   3,277,095
COPPER COMPLEX AND METHOD OF MAKING
Original Filed May 29, 1961

Inventors:
Harry S. Blanchard;
Herman L. Finkbeiner,
by
Their Agent.

United States Patent Office 3,277,095
Patented Oct. 4, 1966

3,277,095
COPPER COMPLEX AND METHOD OF MAKING
Harry S. Blanchard, Schenectady, and Herman L. Finkbeiner, Ballston Lake, N.Y., assignors to General Electric Company, a corporation of New York
Original application May 29, 1961, Ser. No. 113,363, now Patent No. 3,219,625, dated Nov. 23, 1965. Divided and this application Dec. 22, 1964, Ser. No. 425,995
8 Claims. (Cl. 260—270)

This application is a division of our application Serial No. 113,363, filed May 29, 1961.

This invention relates to new chemical compounds and to a method of their production. More specifically, this invention relates to a cupric complex having the emperical formula

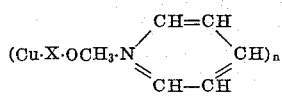

where X is selected from the group consisting of chlorine and bromine and $n$ is an integer and is at least 1 and to the method of preparation of these compounds.

In an application, Serial No. 212,128, filed July 24, 1961—Hay, which is a continuation-in-part of both Serial No. 69,245—Hay, filed November 15, 1960, now abandoned and Serial No. 744,086, filed June 24, 1958, now abandoned, all of which are assigned to the same assignee as the present invention, there is disclosed and claimed a method of oxidizing phenols in which the catalysts are a tertiary amine and a cuprous salt soluble in the tertiary amine and capable of existing in the cupric state. Pyridine is one of the tertiary amines which may be used. Cuprous bromide or cuprous chloride are two of the cuprous salts which may be used.

We have now found that the green crystalline cupric complexes having the empirical formula

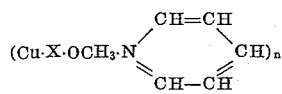

where X is selected from the group consisting of chlorine and bromine and $n$ is an integer and is at least 1, are extremely active catalysts for the oxidation of phenols either to phenylene oxide polymers, also known as polyphenylene ethers, and polyphenylene oxides, or to diphenoquinones. These new catalysts are more active and cause a faster oxidation reaction than can be obtained when the corresponding oxidation of the phenol is carried out in the presence of pyridine and cuprous chloride or cuprous bromide.

Figure 1:
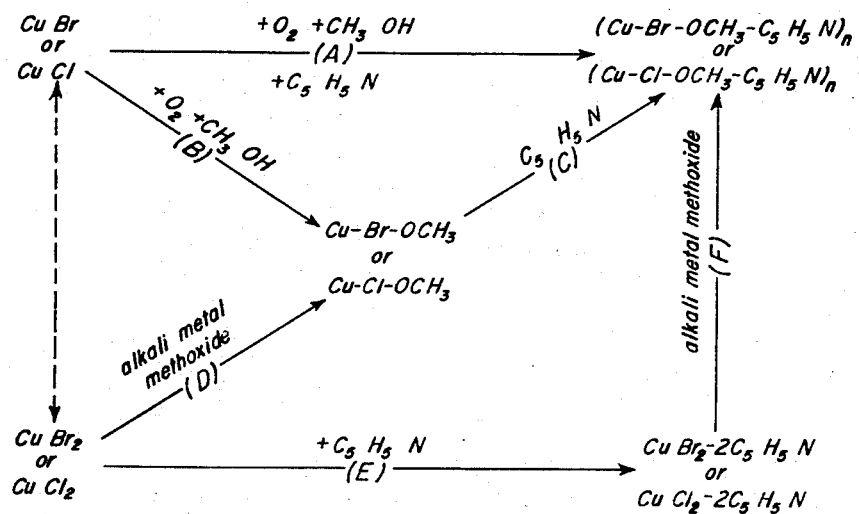

In order that those skilled in the art may better understand our invention, the following more detailed description is given which should be read in conjunction with the attendant drawings, in which:

FIG. 1 is a diagram illustrating the alternative routes by which the cupric complex corresponding to the empirical formula

Figure 2:
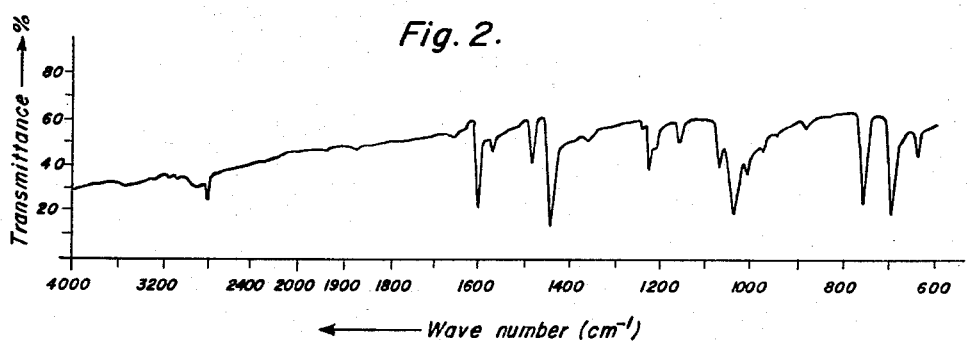
Figure 3:
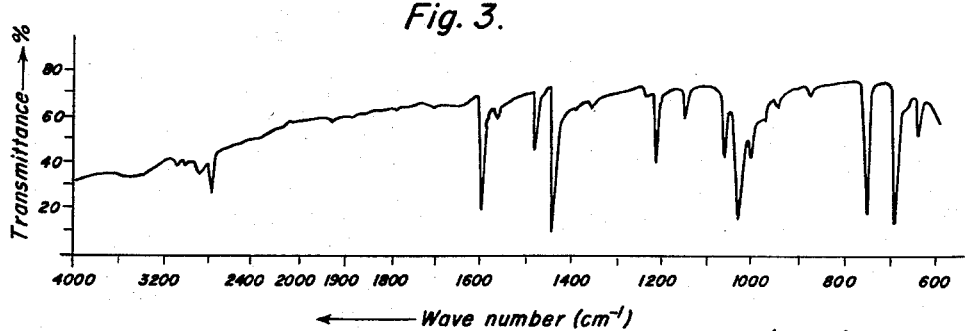

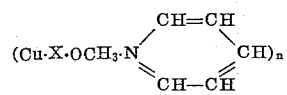

wherein $n$ is an integer and is at least 1, and X is chlorine or bromine, may be prepared;

FIG. 2 is the infrared spectra of our compound prepared by the alternative routes demonstrated in FIG. 1 when the halogen is chlorine; and FIG. 3 is the infrared spectra of our compound prepared by the alternative routes shown in FIG. 1 in which bromine is substituted for the chlorine in the compound of FIG. 2.

As FIG. 1 illustrates, there are several alternative ways of producing the compounds of our invention. A cuprous salt selected from the group consisting of cuprous chloride and cuprous bromide may be dissolved in anhydrous methanol and reacted with oxygen either in the presence or absence of pyridine. In the presence of pyridine, the reaction goes directly along path A as shown in FIG. 1. The first step may be the formation of the pyridine complex with the cuprous salt. In the absence of pyridine, the reaction proceeds to an intermediate compound as shown along route B, which, when pyridine is then added, proceeds along route C to produce the same final compound as is produced along path A.

The conversion of cuprous bromide or cuprous chloride to the corresponding cupric salts or the conversion of cupric bromide or cupric chloride to the corresponding cuprous salts is well known in the art and forms no part of this invention. Because of the ready commercial availability of either cupric or cuprous salts, there is no incentive, in practicing our invention, to convert either the cuprous salts to the corresponding cupric salts or vice versa, as a separate step of the process. Nevertheless, such as alternative is not excluded.

Cupric bromide or cupric chloride may be dissolved in methanol and reacted either, first, with an alkali methoxide as illustrated along path D, to produce the same intermediate as produced by the reaction of the cuprous salt with oxygen in the methanol solution, as illustrated along path B, which is then reacted with pyridine as illustrated along path C, to produce the desired compound, or the cupric bromide or cupric chloride may be reacted with pyridine to produce the pyridine complex of the cupric salt which is then reacted with the alkali metal methoxide to produce the desired final compound. When the starting copper salt is either cuprous chloride or cupric chloride, the product, no matter which procedure is used, has the infrared spectra shown in FIG. 2. When the starting compound is either cuprous bromide or cupric bromide, the final product no matter which process is used, has the infra-red spectra shown in FIG. 3.

Table I shows the result obtained by elemental analysis of the compound containing chlorine whose infrared spectrum is shown in FIG. 2.

TABLE I

|    | Calc. for $(Cu.Cl.OCH_3.C_5H_5N)_n$ | Found |
|----|----|----|
| Cu | 30.4 | 30.3 |
| N  | 6.7  | 6.6  |
| Cl | 17.0 | 17.3 |
| C  | 34.4 | 33.6 |
| H  | 3.8  | 3.7  |

Such analysis confirms the empirical formula but does not define $n$. The numerical value to be assigned to $n$ can only be determined by determining the molecular weight. Unfortunately, such a determination depends on being able to dissolve the product in a solvent and so far we have been unable to find any solvent in which the green crystalline complex is soluble, except under conditions in which it reacts to form a new compound. Because of the well-known ability of copper in the divalent state to form four-coordinate complexes, we believe that our compounds have one of the structures A, B, C, D or E.

(A)

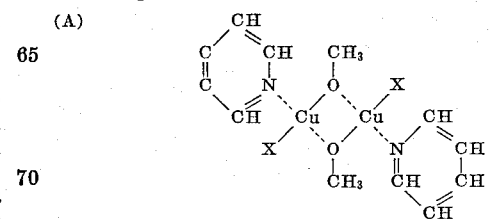

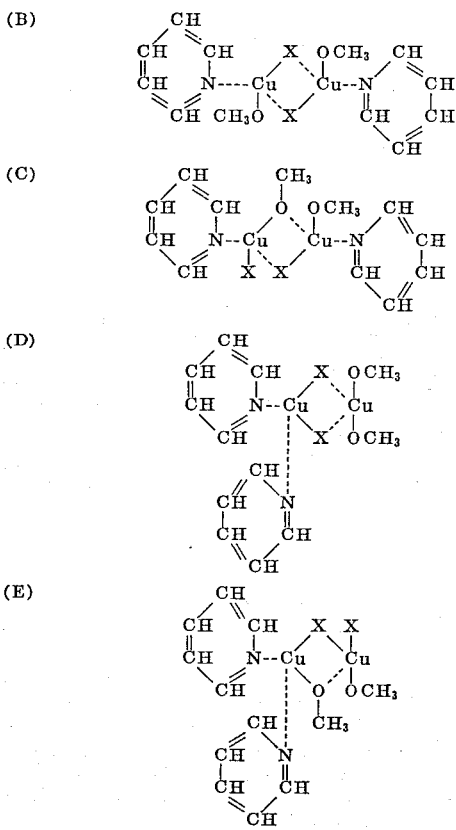

where in each case X is either chlorine or bromine. The fact that the compounds in which X is either chlorine or bromine are crystalline compounds indicate that the materials are of low molecular weight and therefore we believe that n is most likely 2 and in any case probably does not exceed 6 or 8, but it could be as low as 1.

Surprisingly enough, these green, crystalline compounds cannot be prepared from such closely related materials as cuprous iodide, alkyl-substituted pyridines, or ethanol.

As disclosed and claimed in our copending application, Serial No. 113,363, from which this application has been divided, our unique complexes may be used as catalysts for the oxidation of 2,6-disubstituted phenols for the preparation of either phenylene oxide polymers or diphenoquinones, according to the following schematic diagram, Equation I

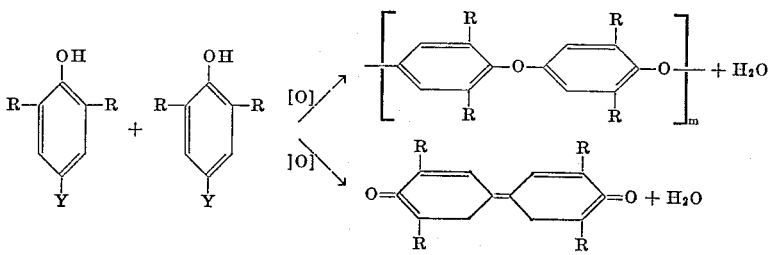

where $m$ is an integer having a value of at least 10, R is a monovalent substituent selected from the group consisting of hydrocarbon and halohydrocarbon having at least 2 carbon atoms and Y is a monovalent substituent selected from the group consisting of hydrogen, chlorine, bromine, and iodine.

In order that those skilled in the art may better understand our invention, the following examples are given which are illustrative of the practice of our invention and are not intended for purposes of limitation. In the examples, all parts are by weight, unless stated otherwise.

*Example 1*

A reaction mixture containing 0.5 gram of cuprous chloride, 2 ml. of dry pyridine and 50 ml. of dry methanol were stirred in an atmosphere of oxygen for 16 hours in an apparatus designed so that the amount of oxygen absorbed could be determined. During the reaction 38.8 ml. of oxygen were absorbed, and a green crystalline solid had precipitated from the reaction mixture, which, after filtering from the reaction mixture and drying, weighed 1 gram, or 95.5% of theory.

The infrared absorption spectra of this compound is identical with that shown in FIG. 2 and its elemental analysis is given in Table I.

*Example 2*

A solution of 0.01 mole of sodium methoxide in methanol was added to a solution of 0.01 mole of cupric chloride (1.345 grams) in 50 ml. of anhydrous methanol. A green precipitate was filtered off and dried, a sample was analyzed for copper, and found to have 48.8% copper which is the correct amount for the empirical formula $CuClOCH_3$. This reaction was then repeated and without filtering off the precipitate, 0.025 mole of pyridine was added to the suspension and stirred for 2 hours, by which time the precipitate had turned to a green crystalline compound whose infrared spectra was identical with that obtained with the product of Example 1.

*Example 3*

The pyridine complex of cupric chloride was prepared by reacting 6.75 grams of cupric chloride with 10 ml. of pyridine in 300 ml. methanol as solvent. The complex was isolated and analyzed and found to have 22% copper as compared to 21.75% copper calculated for the compound $CuCl_2 \cdot 2C_6H_5N$. A solution of 1.8 grams of this complex dissolved in 20 ml. of anhydrous methanol was reacted with 5 ml. of 1.21 N sodium methoxide in anhydrous methanol. A green crystalline compound precipitated from the reaction mixture which had an infrared spectra identical with that of the compound obtained in Example 1.

*Example 4*

The pyridine complex of cupric bromide was prepared by reacting 11.2 grams of cupric bromide dissolved in 300 ml. of methanol with 10 ml. of pyridine. This pyridine complex was isolated and 2.04 grams was suspended in 20 ml. of anhydrous methanol, to which was added 5 ml. of 1.018 N sodium methoxide in anhydrous methanol with stirring. The original solution was heterogeneous but turned blue during the reaction which was carried out under nitrogen to exclude oxygen. The reaction mixture turns deep green during the one-half hour reaction, but remains heterogeneous. The reaction mixture was filtered at the end to isolate a deep green solid which was air-dried. The infrared spectra of this isolated material is shown in FIG. 3 which is nearly identical with the infrared spectra in FIG. 2. The product was analyzed for copper by electrolysis and found to have 25.0% copper as compared to 25.05% calculated for the empirical formula $Cu \cdot Br \cdot OCH_3 \cdot C_6H_5N$.

When the above reaction was repeated, the product was analyzed for carbon and hydrogen, and found to have 28.1% carbon and 3.2% hydrogen as compared with 28.6% carbon and 3.15% hydrogen calculated for the above empirical formula.

Obviously, other modifications and variations of the present invention are possible in the light of the above teachings. It is, therefore, to be understood that changes may be made in the particular embodiments of the invention described which are within the full intended scope of the invention as defined by the appended claims.

What we claim as new and desire to secure by Letters Patent of the United States is:

1. The novel crystalline cupric complex having the empirical formula

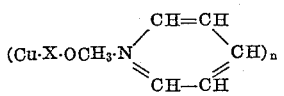

where X is selected from the group consisting of chlorine and bromine and $n$ is an integer and is at least 1.

2. The cupric complex of claim 1 where X is chlorine.
3. The cupric complex of claim 1 where X is bromine.
4. The method of making the crystalline cupric complex having the empirical formula

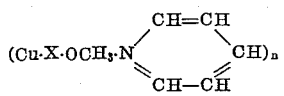

where X is selected from the group consisting of chlorine and bromine and $n$ is an integer and is at least 1, which comprises reacting a cuprous salt selected from the group consisting of cuprous chloride and cuprous bromide in an anhydrous solution in methanol with oxygen, in the presence of pyridine and isolating the novel crystalline compound which precipitates from the reaction mixture.

5. The method of claim 4 wherein the cuprous salt is cuprous chloride.
6. The method of claim 4 wherein the cuprous salt is cuprous bromide.
7. The method of making the crystalline cupric complex having the empirical formula

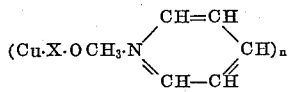

where X is selected from the group consisting of chlorine and bromine and $n$ is an integer and is at least 1, which comprises reacting a cupric salt selected from the group consisting of cupric chloride and cupric bromide with an alkali metal methoxide in an anhydrous methanol solution, adding pyridine to the resulting reaction mixture and isolating the novel crystalline compound which separates from the reaction mixture.

8. The method of claim 7 wherein the alkali metal methoxide is sodium methoxide and the cupric salt is cupric chloride.

References Cited by the Examiner

Kinoshita Bul. Chem. Soc., Japan, vol. 32, pp. 777–80 (1959).

Tarent'ev Chem. Abst., vol. 50, 4807 (1956).

ALEX MAZEL, *Primary Examiner.*

HENRY R. JILES, *Examiner.*

DONALD G. DAUS, *Assistant Examiner.*